July 3, 1928. Re. 17,018

G. F. QUINBY

INNERSOLE APPLYING DEVICE

Original Filed Nov. 3, 1919 2 Sheets-Sheet 1

Inventor
George F. Quinby by C. Russell Riordon
Attorney

July 3, 1928. Re. 17,018

G. F. QUINBY

INNERSOLE APPLYING DEVICE

Original Filed Nov. 3, 1919 2 Sheets-Sheet 2

Inventor
George F. Quinby
by C. Russell Riordan
Attorney

Reissued July 3, 1928. Re. 17,018

UNITED STATES PATENT OFFICE.

GEORGE F. QUINBY, OF BOSTON, MASSACHUSETTS, ASSIGNOR, BY MESNE ASSIGNMENTS, TO KARL S. HOWARD, OF ST. LOUIS, MISSOURI.

INNERSOLE-APPLYING DEVICE.

Original No. 1,352,145, dated September 7, 1920, Serial No. 335,538, filed November 3, 1919. Application for reissue filed April 17, 1928. Serial No. 270,709.

This invention relates to devices of the class contemplated by the appended claims; the particular embodiment, hereinafter more particularly described, is a device for applying the inner sole to boots and shoes.

One of the objects of this invention is the production of a machine of this character in which the inner soles may be forced by air pressure into contact with the inner face of the outer sole and retained in contact therewith until the cement or other tacky substance has set.

Another object is to provide a device of the class contemplated, in which a revoluble table mounted on a pedestal and having a plurality of shoe supports thereon, each having a cooperating inflatable pad, has associated therewith air controlling means whereby upon rotation of the table air is admitted to and exhausted from the pads.

In accordance with one embodiment of this invention the bearing between the pedestal and the table provides valve means for controlling the supply and exhaust of air to and from the pads. For this purpose the pedestal part of the bearing has air supply and exhaust ports coupled with corresponding connections, while the table part of the bearing has ports cooperating with those supply and exhaust ports and coupled with connections to the respective pads. The ports leading to the pads are arranged circumferentially of the bearing, while the supply and exhaust ports are also spaced circumferentially but so as to aline successively with the pad ports. Accordingly upon rotation of the table the pad ports are successively alined with the supply port and thereafter successively alined with the exhaust port. As each pad port alines with the supply port, air will be admitted to the selected pad to inflate the same; this inflation of the selected pad will be maintained until the port leading to that pad alines with the exhaust port when the pad will be deflated. This procedure takes place for each pad in succession, as the table is rotated. The bearing is preferably a tapered one so as to provide a tight valve avoiding leakage of air.

In accordance with one embodiment of this invention, each shoe support has a cooperating abutment, between which and the shoe support is arranged a cooperating inflatable pad. This abutment is arranged to be positioned or adjusted relatively its cooperating support and pad so as to permit placement of a shoe to be acted upon when the pad is inflated and removal of the shoe when the operation is completed.

Where the device is employed for the application of an innersole to a shoe, then in accordance with one embodiment of this invention, the shoe support has a chambered top in which is positioned an air receptacle adapted to be inflated after the shoe has been positioned upon said support.

The invention further consists in certain novel features of construction and arrangement of parts which will be fully understood by reference to the description of the drawings and to the claims to be hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described, except as required by the scope of the appended claims:

Of the drawings.

Similar characters indicate like parts throughout the several figures of the drawings.

Figure 1:
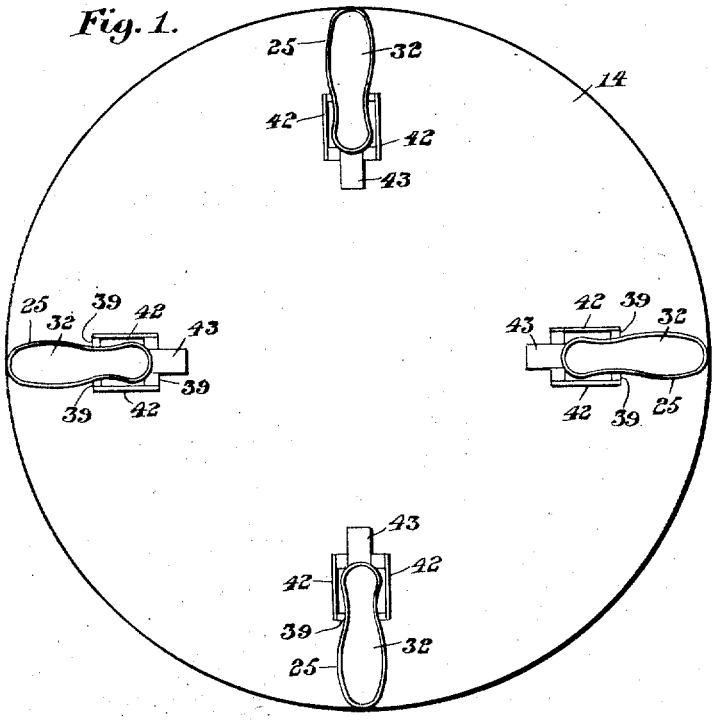
Fig. 1, represents a plan of a machine embodying the principles of the present invention.

In the drawings, 10 is a pedestal adapted to be secured to the floor of a building.

This pedestal is provided at the top with a reduced cone-shaped projection 11 which fits into the cone-shaped socket 12 formed in the hub 13 of a rotatable table 14, to provide a tapered bearing, forming valve means.

The periphery of the projection 11 has formed therein, a groove 15 extending partly around said projection and providing an air supply port, while between the opposed ends of said groove 15 is an exhaust port 16, this exhaust port 16 being in the same horizontal plane with the groove 15.

The hub 13 has a plurality of radial air passages 17 extending outwardly from the socket 12 and in the same plane with the groove 15 and exhaust port 16. The passages 17 provide ports on the table part of the bearing adapted to cooperate with the ports 15 and 16 on the pedestal part of the bearing.

The peripheral groove 15 has an air passage 18 extending therefrom the opposite end of which communicates with an air inlet pipe or connection 19 in which is disposed a valve 20 to control the admission of air under pressure from any suitable source.

Figure 2:
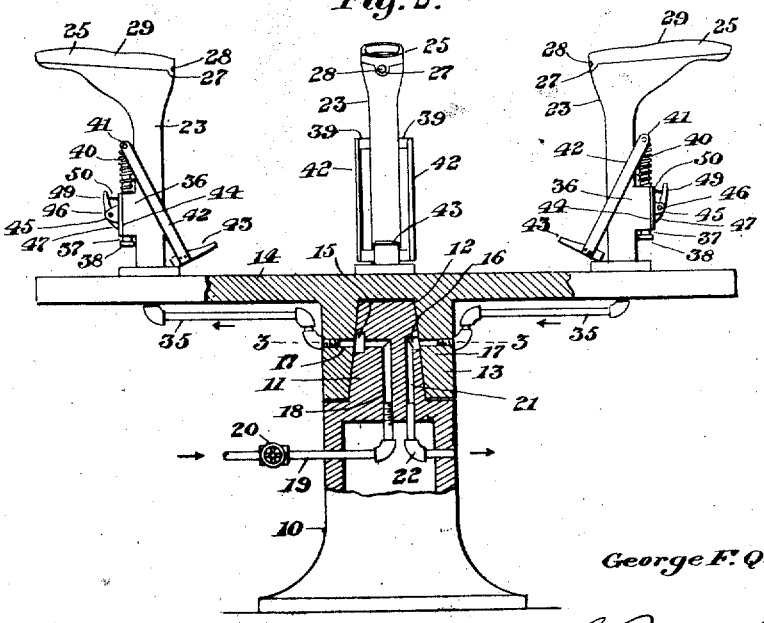
Fig. 2 represents an elevation of the same, with parts thereof shown in section.

The exhaust port 16 has an air passage 21 extending therefrom, the lower end of which communicates with a pipe or connection 22, extending outwardly through the pedestal 10, all as indicated in Fig. 2 of the drawings.

Figure 4:
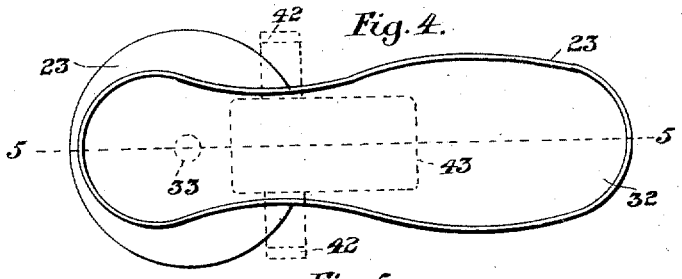
Fig. 4 represents a plan of one of the shoe supports.
Figure 5:
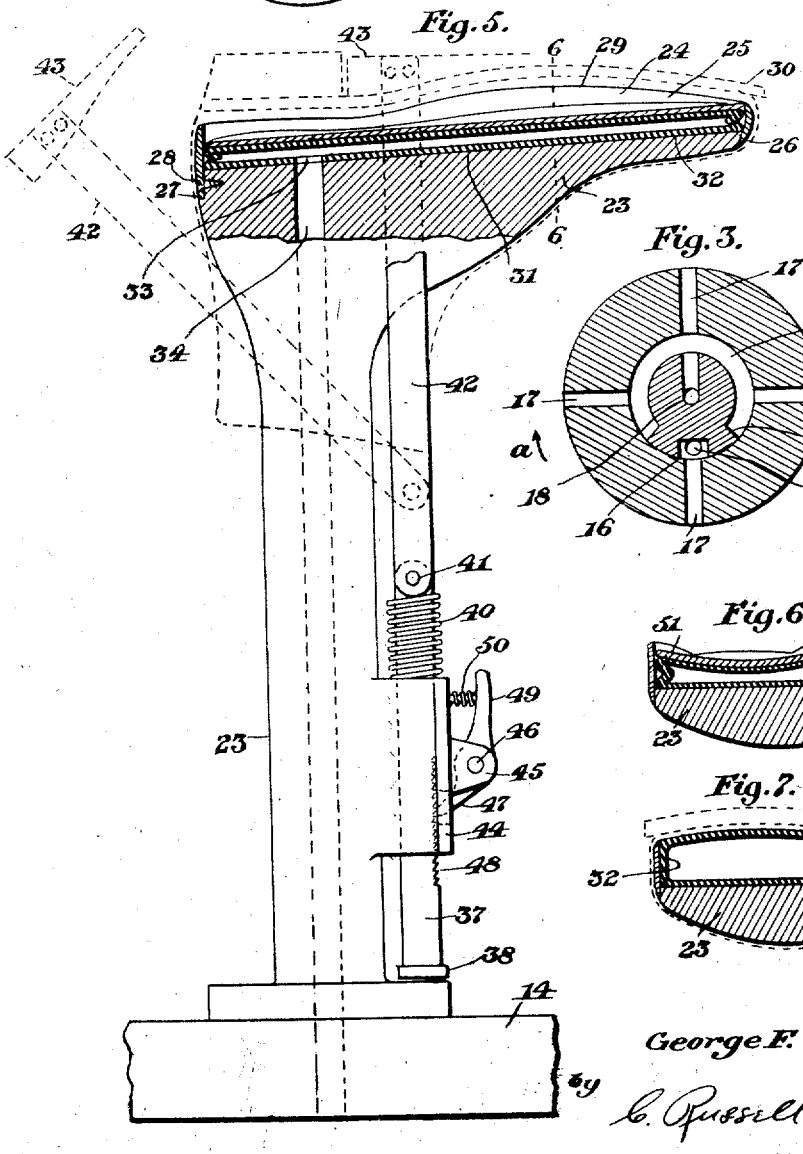
Fig. 5 represents a vertical section of the same on line 5, 5, on Fig. 4.

Extending upwardly from the table 14 are a plurality of shoe supports 23 each of which has a depression 24 in the top thereof, this depression 24 being formed by a metal rim 25 surrounding the upper end of the shoe support 23 as clearly indicated in Figs. 4 and 5 of the drawings.

The toe end of the rim 25 has an inturned ear 26 which engages a notch in the toe end of the shoe support as indicated in Fig. 5 of the drawings.

The heel end of the rim 25 has a downwardly extending ear 27 through which extends a screw 28 threaded to the shoe support 23.

By displacing the screw 28, the rim 25 may be removed from the shoe support 23 and another rim of different shape substituted therefor.

The upper edge 29 of the rim 25 is curved, as indicated in Fig. 5 of the drawings, to fit the inner face of the outer sole of the shoe 30 shown in dotted lines in said Fig. 5.

The top face 31 of the shoe support 23 is preferably flat and preferably secured thereto by cement is an inflatable pad 32, the edges of which are confined within the rim 25. The pad 32 is prevented from expanding laterally by said rim 25.

The pad 32 has an opening 33 in the bottom thereof which communicates with a vertical air passage 34 extending the entire length of the shoe support 23.

The lower end of each of the air passages 34 communicates with a pipe or connection 35 extending to a radial air passage 17 in the hub 13.

Each shoe support 23 is provided with a vertical bearing 36 for a slidable member 37 having a head 38 formed thereon to limit the upward movement of said member 37.

The upper end of the slidable member 37 has outwardly extending alined hubs 39 and surrounding the slidable member 37 between said hubs and the bearing 36, is a spring 40 which normally retains said slidable member 37 in raised position as indicated in Fig. 2 of the drawings.

Pivoted at 41 to the hubs 39 are two parallel arms 42, the outer ends of which have secured thereto a clamping plate or abutment 43.

The bearing 36 for the slidable member 37 is closed by a plate 44 having projecting therefrom, ears 45 to which is pivoted at 46 a pawl 47 adapted to engage the ratchet teeth 48 formed in one face of the slidable member 37.

The pawl 47 is provided with an arm 49 between which and the plate 44, is a spring 50 adapted to force the pawl 47 into engagement with the teeth 48.

Figure 6:
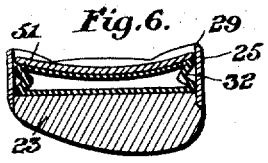
Fig. 6 represents a transverse section on line 6, 6, on Fig. 5.
Figure 7:
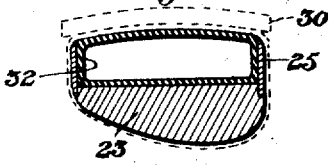
Fig. 7 represents a transverse section on line 6, 6, on Fig. 5 with the bag inflated.

In the operation of the machine, when applying an innersole to a shoe, an inner sole 51 with a tacky substance spread over its entire upper face is placed upon the pad 32 as indicated in Fig. 6 of the drawings, this operation being performed while the pad 32 is deflated.

The shoe 30 is then positioned upon the support 23 as indicated in dotted lines in Fig. 5 of the drawings, and the operator then seizes the arms 42 and moves them about the pivot 41 until said arms are in a vertical position. This positions the abutment for cooperation with the shoe support and pad.

He then presses down upon the clamping plate 43 until the inner face of the outer sole is firmly in contact with the curved upper edge 29 of the rim 25.

When the clamping member has been thus pressed down into the position indicated in full lines in Fig. 5 of the drawings, the pawl 47 will be forced by the spring 50 into locking engagement with the teeth 48 of the slidable member 37.

The shoe is applied to the shoe support which has its air passage 34 in communication with the exhaust port 16. When the shoe has been thus mounted upon the shoe support 23 and clamped thereto, the table 14 is moved in the direction of the arrow *a* on Fig. 3 of the drawings, until the passage 17 is in register with the peripheral groove 15.

As soon as this passage 17 registers with the peripheral groove 15, air under pressure will be admitted through the pipe 19, groove 15 and passage 17, to the pipe 35, and then through the passage 34 into the pad 32. The pad 32 will thus be inflated and as the upper portion thereof is raised, it will force the inner sole 51 into contact with the inner face of the outer sole of the shoe 30 thereby permitting the cement or other tacky substance on the upper face of said inner sole, to adhere to the inner face of the outer sole.

Figure 3:
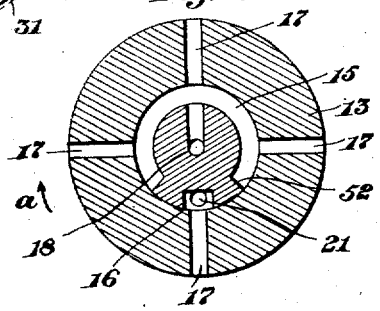
Fig. 3 represents a horizontal section on line 3, 3, on Fig. 2.

As the table 14 continues to rotate in the direction of the arrow *a* on Fig. 3 of the drawings, the pad 32 will remain inflated and permit the cement or other tacky substance to firmly set.

When the passage 17 passes the end 52, said passage 17 will be closed and remain closed until the said passage registers with the closed port 16 when the air within the inflated pad 32 will be permitted to escape and cause the deflation of said pad, the inner sole being firmly secured to the outer sole.

In practice the air will be retained in each pad for a period governed by the nature of the cement and the character of the work. Actually the operator will place a shoe in position on a selected support and in cooperation with its pad and abutment while the port leading to that pad is in alignment with the exhaust port; the table will then be turned so as to align that port with the air supply port thereby causing air to be admitted to the pad for inflating the same; the operator will then proceed to place a shoe on the next succeeding support and in cooperation with its pad and abutment, while that pad has its port in alignment with the exhaust port; the table is then again turned another step to align that pad port with the air supply port. This procedure is repeated for each shoe support, and by proper control of the operations, and with the required number of shoe supports, the operations can be so governed that when an inflated pad again arrives at the exhaust port, the shoe will be in condition to be taken off of the device.

When this has been accomplished, the shoe may be removed from the support 23, a new inner sole placed upon the deflated pad, another shoe placed upon the support, and the operation repeated.

While only four supports 23 are shown in the drawings, it is obvious that in practice a larger number of supports would be used.

The pad 32 may be made of rubber or any other material adapted to permit of the required expansion.

This makes a very effective device for applying inner soles to shoes which is simple in construction and easy to operate.

It is believed that the operation of the invention and its many advantages will be readily understood without further description.

Having thus described my invention, I claim:

1. In a device of the class described, a shoe support having a depression in the top thereof adapted to receive a complete inner sole; an expansible pad positioned in said depression; and means for inflating said pad.

2. In a device of the class described, a shoe support having a depression in the top thereof adapted to receive a complete inner sole; an expansible pad secured to the bottom of said depression; and means for inflating said pad.

3. In a device of the class described, a shoe support having a depression in the top thereof adapted to receive a complete inner sole; an expansible pad secured by cement to the bottom of said depression; and means for inflating said pad.

4. In a device of the class described, a shoe support having a flat bottomed depression in the top thereof adapted to receive a complete inner sole and an air passage communicating with said depression having an opening therein registering with said passage; and a valve in said passage.

5. In a device of the class described, a shoe support having a vertical air passage therethrough; an expansible pad on said support communicating with the upper end of said air passage and having an outline conforming to the outline of a complete inner sole; and a continuous flange of equal thickness throughout extending upwardly from said support and surrounding said pad.

6. In a device of the class described, a shoe support having a vertical air passage therethrough; an expansible pad on said support communicating with the upper end of said air passage and having an outline conforming to the outline of a complete inner sole; and a continuous flange extending upwardly from said support and surrounding said pad, said flange being of equal thickness throughout and having its upper edge shaped to conform with the curvature of the outer sole of the shoe to be placed on said support.

7. In a device of the class described, a shoe support having a vertical air passage therethrough; an expansible pad on said support communicating with said passage; and a removable rim on said support surrounding said pad.

8. In a device of the class described, a shoe support having a vertical air passage therethrough; an expansible pad on said support communicating with said passage; a removable rim on said support surrounding said pad; and means for securing said rim to said support.

9. In a device of the class described, a shoe support having an air passage therethrough; an expansible air pad on said support communicating with said passage; a rim secured to said support and surrounding said pad; and means for retaining a shoe on said support during the inflation of said pad.

10. In a device of the class described, a shoe support having an air passage therethrough; an expansible air pad on said support communicating with said passage; a rim secured to said support and surrounding said pad; and a pivoted member adapted to clamp the shoe upon said support to prevent upward movement of said shoe during the inflation of said pad.

11. In a device of the class described, a shoe support having an air passage therethrough; an expansible air pad on said support communicating with said passage; a rim secured to said support and surrounding said pad; a member slidably mounted on said support; means for locking said member in adjusted position; and a shoe clamping member pivoted to the upper end of said slidable member.

12. In a device of the class described, a shoe support having an air passage therethrough; an expansible air pad on said support communicating with said passage; a rim secured to said support and surrounding said pad; a member slidably mounted on said support; a shoe clamping member pivoted to the upper end of said slidable member; a spring for normally retaining said slidable member in raised position; and a locking device for retaining said slidable member in depressed position when in contact with the sole of the shoe.

13. In a device of the class described, a shoe support having an air passage therethrough; an expansible air pad on said support communicating with said passage; a rim secured to said support and surrounding said pad; a member slidably mounted on said support having ratchet teeth; a shoe clamping member pivoted to the upper end of said slidable member; a spring for normally retaining said slidable member in raised position; and a spring-pressed pawl coacting with said ratchet teeth for retaining said slidable member in depressed position when in contact with the sole of the shoe.

14. In a device of the class described, a pedestal; a revoluble table having a hub provided with a socket fitted over the upper end of said pedestal; a plurality of shoe supports secured to said table each having a depression in the top thereof; an inflatable pad for each depression; an air passage extending from each receptacle to said socket; an air inlet pipe in said pedestal communicating with a peripheral groove extending partly around the upper end of said pedestal and adapted to register with said air passages; and an exhaust pipe in said pedestal communicating with a passage adapted to successively register with each of said air passages during the rotation of said table.

15. In a device of the class described, a pedestal; a revoluble table mounted thereon; a plurality of shoe supports on said table each provided with a depression in the top thereof; and inflatable pad in each depression; and means whereby during the rotation of said table air is admitted to each pad, retained therein for a predetermined time and then exhausted therefrom.

16. In a device of the class described, a pedestal; a revoluble table mounted thereon; a plurality of shoe supports on said table; an inflatable pad on the top of each shoe support; and means whereby during the rotation of said table air is admitted to each pad, retained therein and then exhausted therefrom.

17. In a device of the class described, a pedestal; a revoluble table having a hub provided with a cone-shaped socket; a cone-shaped projection on said pedestal fitted to said socket and provided with a peripheral groove extending partly around said hub and having an exhaust port in the same plane with said groove; a plurality of shoe supports on said table provided with vertical air passages extending therethrough; an inflatable air pad on the top of each support and communicating with an air passage; pipes extending from the lower end of said air passages to said socket with their inner ends adapted to register with said groove and exhaust port; an air inlet pipe leading to said peripheral groove; and an exhaust pipe leading from said exhaust port.

18. In a device of the class described, a shoe support; an expansible pad secured to and covering the entire top thereof; and means for inflating said pad.

19. In a device of the class described, a shoe support; an expansible pad secured to and covering the entire top of said support; means for clamping a shoe upon said support; and means for inflating said pad.

20. In a device of the class described, a shoe support having a vertical air passage therethrough; an expansible pad secured to and covering the entire top of said support and communicating with the upper end of said passage; means for clamping a shoe to said support; and means for admitting air under pressure to said pad and subsequently exhausting it therefrom through said air passage.

21. In a device of the class described, a pedestal; a revoluble table mounted thereon; a plurality of shoe supports on said table; an inflatable shoe-engaging pad cooperating with each shoe support; means for conducting air to and from said pads; and means operating upon rotation of said table adapted to admit the air to, retain the same in and exhaust the same from said pads.

22. In a device of the class described, a pedestal; a revoluble table mounted thereon; a plurality of shoe supports on said table; an inflatable shoe-engaging pad cooperating with each shoe support; means for conducting air to and from said pads; means adapted in one position of said table to admit air to a selected pad; and means adapted in another position of said table to exhaust the air from said pad, the air being retained in said pad between the admission and exhaust.

23. In a device of the class described, a pedestal; a revoluble table mounted thereon; a plurality of shoe supports on said table; an inflatable shoe-engaging pad cooperating with each shoe support; means for conducting air to and from said pads; means adapted upon rotation of said table to admit air to said pads in succession; and means adapted upon rotation of said table to exhaust the air from said pads in succession, the air being retained in said pads between the admission and exhaust.

24. In a device of the class described, a pedestal; a revoluble table mounted thereon; a plurality of shoe supports on said table; an inflatable shoe-engaging pad cooperating with each shoe support; means for conducting air to and from said pads; means adapted in one position of said table to admit air to a selected pad; means adapted in another position of said table to exhaust the air from said pad; and means adapted in an intermediate position of said table to retain the air in said pad.

25. In a device of the class described, a pedestal; a revoluble table mounted thereon; a plurality of shoe supports on said table; an inflatable shoe-engaging pad cooperating with each shoe support; means for conducting air to and from said pads; means adapted upon rotation of said table to admit air to said pads in succession; means adapted upon rotation of said table to exhaust the air from said pads in succession; and means adapted upon rotation of said table to retain the air in said pads in succession.

26. In a device of the class described, a pedestal; a revoluble table mounted thereon; a plurality of shoe supports on said table; an inflatable shoe-engaging pad cooperating with each shoe support; means for conducting air to and from said pads; air supply and exhaust connections; and valve means between said conducting means and said connections; said valve means operating upon rotation of said table to admit the air to and exhaust the same from said pads, the air being retained in said pads between the admission and exhaust.

27. In a device of the class described, a pedestal; a revoluble table mounted thereon; a plurality of shoe supports on said table; an inflatable shoe-engaging pad cooperating with each shoe support; said pedestal having air supply and exhaust ports; said table having cooperating ports; and connections from said table ports to said pads, the air being retained in said pads between the admission and exhaust.

28. In a device of the class described, a pedestal; a revoluble table mounted thereon; a plurality of shoe supports on said table; an inflatable shoe-engaging pad cooperating with each shoe support; a bearing between said pedestal and said table; the pedestal part of said bearing having air supply and exhaust ports; the table part of said bearing having cooperating ports; and connections from said table ports to said pads, the air being retained in said pads between the admission and exhaust.

29. In a device of the class described, a pedestal; a revoluble table mounted thereon; a plurality of shoe supports on said table; an inflatable shoe engaging pad cooperating with each shoe support; a tapered supporting bearing between said pedestal and said table; the pedestal part of said bearing having air supply and exhaust ports; the table part of said bearing having cooperating ports; and connections from said table ports to said pads, the air being retained in said pads between the admission and exhaust.

30. In a device of the class described, a pedestal; a revoluble table mounted thereon; a plurality of shoe supports on said table; a cooperating abutment for each shoe support; an inflatable pad between each shoe support and its abutment; means for conducting air to and from said pads; and means operating upon rotation of said table adapted to admit the air to, retain the same in and exhaust the same from said pads.

31. In a device of the class described, a pedestal; a revoluble table mounted thereon; a plurality of shoe supports on said table; a cooperating abutment for each shoe support; means for positioning said abutment and said shoe support relatively; an inflatable pad between each shoe support and its abutment; means for conducting air to and from said pads; and means operating upon rotation of said table adapted to admit the air to, retain the same in and exhaust the same from said pads.

32. In a device of the class described, a pedestal; a revoluble table mounted thereon; a plurality of shoe supports on said table; a cooperating abutment for each shoe support; an inflatable pad between each shoe support and its abutment; means whereby said abutment and said shoe support may be shifted relatively to permit placement of a shoe; means for conducting air to and from said pads; and means operating upon rotation of said table adapted to admit the air to, retain the same in and exhaust the same from said pads.

33. In a device of the class described, a pedestal; a revoluble table mounted thereon; a plurality of shoe supports on said table; a cooperating abutment for each shoe support; an inflatable pad between each shoe support and its abutment; means for adjusting said abutment and said shoe support relatively and with respect to their cooperating pad; means for conducting air to and from said pads; and means operating upon rotation of said table adapted to admit the air to, retain the same in and exhaust the same from said pads.

In testimony whereof I affix my signature this 12th day of April, 1928.

GEORGE F. QUINBY.